US011508247B2

(12) United States Patent
Saxena et al.

(10) Patent No.: US 11,508,247 B2
(45) Date of Patent: Nov. 22, 2022

(54) LIDAR-BASED AIRCRAFT COLLISION AVOIDANCE SYSTEM

(71) Applicant: HONEYWELL INTERNATIONAL INC., Morris Plains, NJ (US)

(72) Inventors: Sunit Kumar Saxena, Karnataka (IN); Niranjan Kalyandurg, Karnataka (IN); Shrikant Rao, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1300 days.

(21) Appl. No.: 15/661,215

(22) Filed: Jul. 27, 2017

(65) Prior Publication Data

US 2019/0035291 A1 Jan. 31, 2019

(51) Int. Cl.
| | | |
|---|---|---|
| *G08G 5/00* | (2006.01) | |
| *G08G 5/04* | (2006.01) | |
| *H04B 7/185* | (2006.01) | |
| *G01S 17/933* | (2020.01) | |
| *G01S 17/89* | (2020.01) | |

(Continued)

(52) U.S. Cl.
CPC ............ *G08G 5/045* (2013.01); *B64D 45/00* (2013.01); *B64D 47/04* (2013.01); *B64D 47/06* (2013.01); *G01S 7/51* (2013.01); *G01S 17/66* (2013.01); *G01S 17/87* (2013.01); *G01S 17/89* (2013.01); *G01S 17/933* (2013.01); *G08G 5/0021* (2013.01); *G08G 5/0086* (2013.01); *G08G 5/065* (2013.01); *H04B 7/18506* (2013.01)

(58) Field of Classification Search
USPC ...................................................... 356/5.01
See application file for complete search history.

(56) References Cited

U.S. PATENT DOCUMENTS

| | | |
|---|---|---|
| 5,314,037 A | 5/1994 | Shaw et al. |
| 9,041,915 B2 | 5/2015 | Earhart et al. |

(Continued)

FOREIGN PATENT DOCUMENTS

| | | |
|---|---|---|
| WO | 2015109289 A1 | 7/2015 |
| WO | 2017055549 A1 | 4/2017 |

OTHER PUBLICATIONS

Predota, J.; LiDAR based obstacle detection and collision avoidance in an outdoor environment; Czech Technical University in Prague (https://www.cvut.cz/en) May 2016.

(Continued)

*Primary Examiner* — James R Hulka
(74) *Attorney, Agent, or Firm* — Lorenz & Kopf, LLP

(57) ABSTRACT

An aircraft collision avoidance system includes a plurality of three-dimensional (3D) light detection and ranging (LI-DAR) sensors, a plurality of sensor processors, a plurality of transmitters, and a display device. Each 3D LIDAR sensor is enclosed in an aircraft exterior lighting fixture that is configured for mounting on an aircraft, and is configured to sense objects within its field-of-view and supply sensor data. Each sensor processor receives sensor data and processes the received sensor data to determine locations and physical dimensions of the sensed objects. Each transmitter receives the object data, and is configured to transmit the received object data. The display device receives and fuses the object data transmitted from each transmitter, fuses the object data and selectively generates one or more potential obstacle alerts based on the fused object data.

20 Claims, 6 Drawing Sheets

(51) Int. Cl.

| | | |
|---|---|---|
| *G01S 7/51* | (2006.01) | |
| *G01S 17/66* | (2006.01) | |
| *B64D 47/06* | (2006.01) | |
| *B64D 47/04* | (2006.01) | |
| *B64D 45/00* | (2006.01) | |
| *G01S 17/87* | (2020.01) | |
| *G08G 5/06* | (2006.01) | |

(56) References Cited

U.S. PATENT DOCUMENTS

| | | | |
|---|---|---|---|
| 9,069,080 | B2 | 6/2015 | Stettner et al. |
| 9,086,486 | B2 | 7/2015 | Gilliland et al. |
| 9,207,319 | B2* | 12/2015 | Starr .................. G01S 13/93 |
| 9,547,993 | B2 | 1/2017 | Khatwa et al. |
| 9,581,692 | B2* | 2/2017 | Lamkin ................ G08G 5/0021 |
| 9,648,313 | B1* | 5/2017 | Henry .................. H04N 13/383 |
| 9,875,661 | B2* | 1/2018 | Kunzi .................. G05D 1/0088 |
| 2002/0117340 | A1 | 8/2002 | Stettner |
| 2012/0044476 | A1* | 2/2012 | Earhart ................ G01S 3/7867 |
| | | | 356/4.01 |
| 2012/0274922 | A1 | 11/2012 | Hodge |
| 2013/0321192 | A1* | 12/2013 | Starr .................. G01S 13/91 |
| | | | 342/29 |
| 2014/0062756 | A1* | 3/2014 | Lamkin .................. G01S 7/04 |
| | | | 342/29 |
| 2014/0160460 | A1* | 6/2014 | Gilliland ............... G01S 7/4813 |
| | | | 356/5.01 |
| 2014/0350836 | A1* | 11/2014 | Stettner .................. G01S 7/481 |
| | | | 701/301 |
| 2015/0262492 | A1* | 9/2015 | Barnes .................. B64D 47/08 |
| | | | 701/301 |
| 2016/0070264 | A1* | 3/2016 | Hu ....................... G08G 5/0069 |
| | | | 701/2 |
| 2016/0125746 | A1 | 5/2016 | Kunzi et al. |
| 2016/0163205 | A1* | 6/2016 | Jenkins ................ G08G 5/0069 |
| | | | 701/3 |
| 2016/0216710 | A1* | 7/2016 | Hu ....................... G08G 5/0069 |
| 2016/0247406 | A1* | 8/2016 | Khatwa .................... G08G 5/04 |
| 2016/0259038 | A1* | 9/2016 | Retterath ............. G01S 7/4802 |
| 2017/0073083 | A1* | 3/2017 | Hessling-von Heimendahl ......... |
| | | | B64D 47/04 |

OTHER PUBLICATIONS

Trinity Research & Innovation; WingWatch: Aircraft Ground Collision Avoidance System, Nov. 2010.

* cited by examiner

LIDAR-BASED AIRCRAFT COLLISION AVOIDANCE SYSTEM

TECHNICAL FIELD

The present invention generally relates to aircraft collision avoidance systems, and more particularly relates to a LIDAR-based aircraft collision avoidance system.

BACKGROUND

Aircraft pilots often maneuver an aircraft while on the ground. This may happen, for example, during ground operations, such as when the aircraft is taxiing, being maneuvered to or from a hangar, or being maneuvered to or from a terminal. Collisions with an obstacle can not only damage the aircraft, but can also put the aircraft out of service and result in flight cancellations. The costs associated with the repair and grounding of an aircraft are significant. As such, the timely detection and avoidance of obstacles that lie in the ground path of a vehicle is an important issue that needs to be addressed.

Obstacles on the ground, such as structures, other vehicles and other obstacles, may lie in the path of the aircraft. These obstacles can be detected by the pilot via line of sight. However, in many instances, due to the dimensions of the aircraft (e.g., large wing sweep angles, distance from cockpit to wingtip) and the pilot's limited field of view, it can be difficult to monitor extremes of the aircraft during ground operations. As a result, the operator may not be able to detect obstacles that are located in "blind spots" in proximity to the aircraft. In many cases, the pilot may not detect an obstacle until it is too late to take corrective action. To alleviate this, many aircraft include various types of sensors to sense potential or imminent strikes.

In some systems, the sensors that are used are radar sensors, which may be integrated into the aircraft wing tip lights. These systems, however, exhibit certain drawbacks. For example, these systems have exhibited operational issues due to false alarms arising from non-threat objects in the vicinity of the aircraft. This is due, in part, to lack of sensor resolution and concomitant capability to discriminate the size and elevation of potential objects.

Hence, there is a need for an aircraft collision avoidance system that exhibits sufficient resolution and concomitant capability to discriminate the size and elevation of potential objects, to thereby eliminate, or at least reduce, false alarms.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft collision avoidance system includes a plurality of three-dimensional (3D) light detection and ranging (LIDAR) sensors, a plurality of sensor processors, a plurality of transmitters, and a display device. Each 3D LIDAR sensor has a field-of-view and is enclosed in an aircraft exterior lighting fixture that is configured for mounting on an aircraft. Each 3D LIDAR sensor is configured to sense objects within its field-of-view and supply sensor data. Each sensor processor is in operable communication with a different one of the 3D LIDAR sensors to receive the sensor data therefrom. Each sensor processor is configured to process the received sensor data to determine locations and physical dimensions of the sensed objects and generate object data representative of the locations and physical dimensions. Each transmitter is in operable communication with a different one of the sensor processors to receive the object data therefrom, and is configured to transmit the received object data. The display device is configured to receive and fuse the object data transmitted from each transmitter. The display device is further configured to fuse the object data and selectively generate one or more potential obstacle alerts based on the fused object data.

In another embodiment, an aircraft collision avoidance system includes a plurality of three-dimensional (3D) flash light detection and ranging (LIDAR) sensors, a plurality of sensor processors, a plurality of transmitters, and a display device. Each 3D LIDAR sensor has a field-of-view and is enclosed in an aircraft exterior lighting fixture that is configured for mounting on an aircraft. Each 3D LIDAR sensor is configured to sense objects within its field-of-view and supply sensor data. Each sensor processor is in operable communication with a different one of the 3D LIDAR sensors to receive the sensor data therefrom. Each sensor processor is configured to process the received sensor data to determine locations and physical dimensions of the detected objects and generate object data representative of the locations and physical dimensions. Each transmitter is in operable communication with a different one of the sensor processors to receive the object data therefrom, and is configured to wirelessly transmit the received object data. The display device is configured to receive and fuse the object data transmitted from each transmitter. The display device is further configured to fuse the object data and selectively generate one or more potential obstacle alerts based on the fused object data. The display device includes a display, a receiver, and a display processor. The display is coupled to receive image rendering display commands and is configured, upon receipt thereof, to render one or more images. The receiver is configured to wirelessly receive the object data transmitted from each transmitter. The display processor is coupled to the receiver to receive the object data therefrom, and is configured to fuse the object data and supply the image rendering display commands to the display.

In yet another embodiment, an aircraft includes a plurality of three-dimensional (3D) light detection and ranging (LIDAR) sensors, a plurality of sensor processors, a plurality of transmitters, and a display device. Each 3D LIDAR sensor has a field-of-view and is configured to sense objects within its field-of-view and supply sensor data. Each sensor processor is in operable communication with a different one of the 3D LIDAR sensors to receive the sensor data therefrom. Each sensor processor is configured to process the received sensor data to determine locations and physical dimensions of the sensed objects and generate object data representative of the locations and physical dimensions. Each transmitter is in operable communication with a different one of the sensor processors to receive the object data therefrom, and is configured to transmit the received object data. The display device is mounted within the aircraft and is configured to receive and fuse the object data transmitted from each transmitter. The display device is further configured to fuse the object data and selectively generate one or more potential obstacle alerts based on the fused object data.

Furthermore, other desirable features and characteristics of the aircraft and aircraft collision avoidance system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
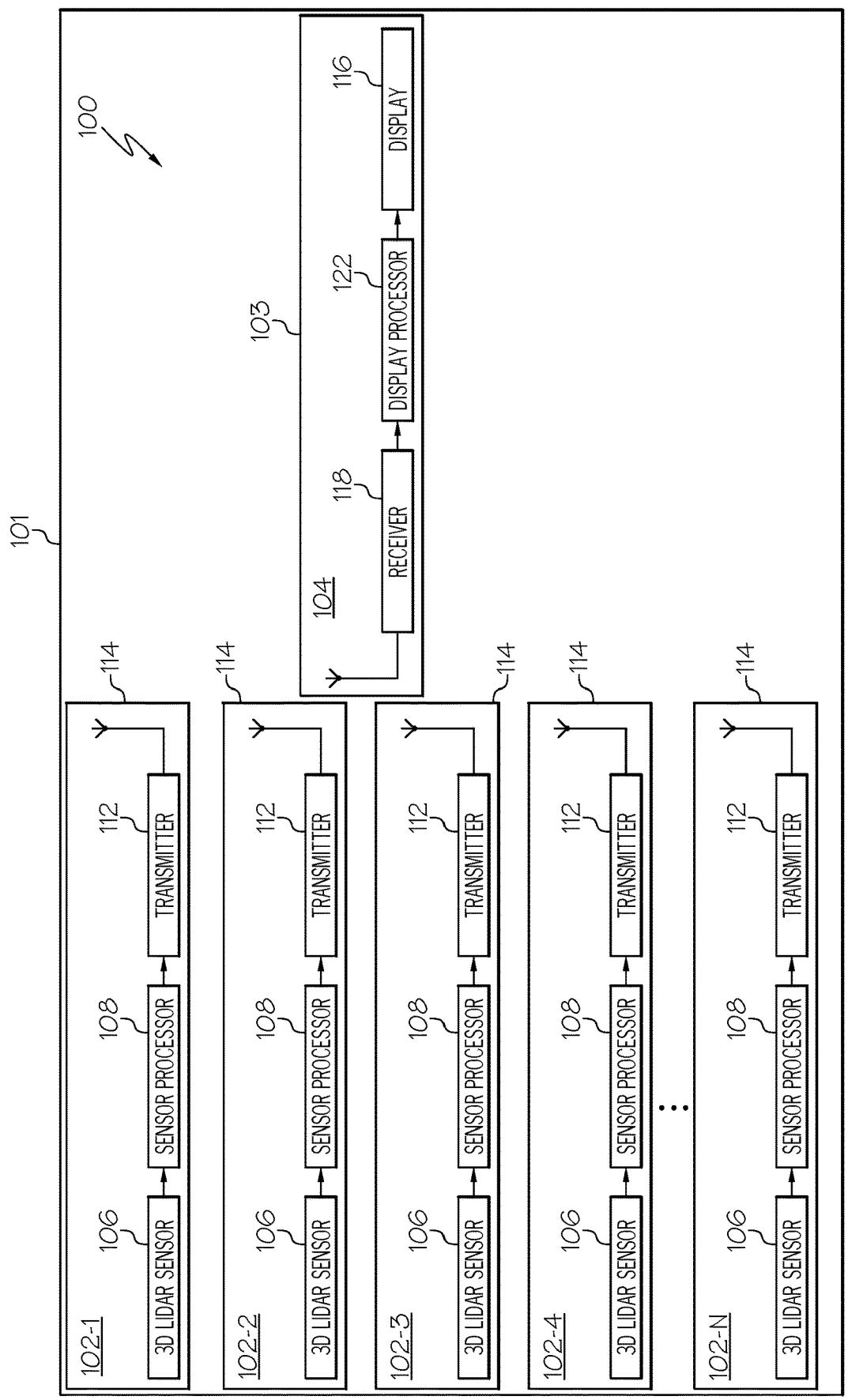
FIG. 1 depicts a functional block diagram of one embodiment of an aircraft collision avoidance system.

Referring first to FIG. 1, a functional block diagram of one embodiment of an aircraft collision avoidance system 100 is depicted. The system 100, at least in the depicted embodiment, includes a plurality of obstacle sensors 102 (e.g., 102-1, 102-2, 102-3, . . . 102-N) and a display device 104. Although the embodiment of the system 100 depicted in FIG. 1 includes five obstacle sensors, it will be appreciated that the system 100 could be implemented with more or less than this number of obstacle sensors 102.

Regardless of the number of obstacle sensors 102, each obstacle sensor 102 includes a three-dimensional (3D) light detection and ranging (LIDAR) sensors 106, a sensor processor 108, and a transmitter 112. Each 3D LIDAR sensor 106, as is generally known, has a field-of-view, and each is configured to sense objects within its field-of-view and supply sensor data. Moreover, at least each of the depicted 3D LIDAR sensors 106 is preferably enclosed in an aircraft exterior lighting fixture 114 that is configured for mounting on an aircraft 101. As will be described further below, the aircraft exterior lighting fixtures 114, and thus the 3D LIDAR 106 sensors, when mounted on an aircraft, are preferably mounted at various locations on the aircraft 101.

The use of multiple 3D LIDAR sensors 106 provides several benefits. For example, multiple 3D LIDAR sensors 106 provide coverage of different regions, which means more coverage of the area around the aircraft 101. Multiple 3D LIDAR sensors 106 allows overlapping fields-of-view, which provides sensing redundancy leading to higher accuracy and reliability.

Figure 2:
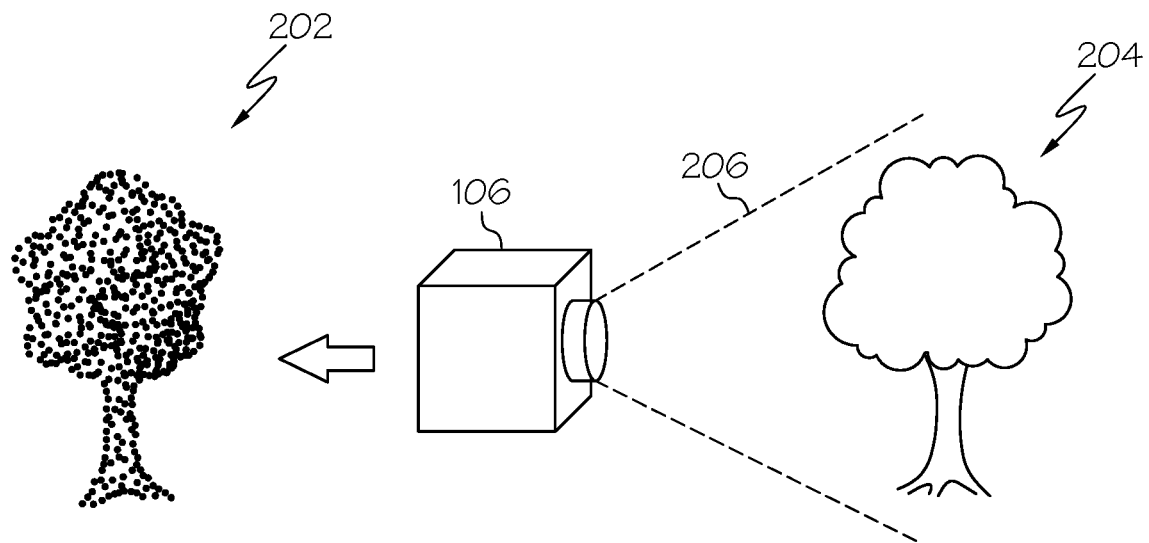
FIG. 2 depicts a simplified functional representation of one embodiment of a 3D flash LIDAR sensor that may be used in the system of FIG. 1.

The 3D LIDAR sensors 106 may be variously configured and implemented using any one of numerous known 3D LIDAR sensor types. In a particular embodiment, however, each 3D LIDAR sensor 106 is implemented using a 3D flash LIDAR sensor. As is generally known, and as depicted in FIG. 2, a 3D flash LIDAR sensor 106 is configured such that the sensor data supplied thereby comprises 3D point cloud data 202 that represents one or more objects 204 within the field of view 206. The 3D point cloud data 202 is generated in real-time at a relatively high rate of several frames (e.g., 10 frames-per-second) per second. As will be described further below, the 3D point cloud data 202 are processed to detect and extract the locations and physical dimensions of each object 204 within the field of view 206.

Returning to FIG. 1, it is seen that each sensor processor 108 is in operable communication with, and is thus coupled to receive the sensor data from, a different one of the 3D LIDAR sensors 106. Each sensor processor 108 is configured to process the received sensor data to determine the locations and physical dimensions of the sensed objects 204 and generate object data representative of the determined locations and physical dimensions. It will be appreciated that, depending on the embodiment, each sensor processor 108 may be implemented or realized with a general-purpose processor, a microprocessor, a controller, a microcontroller, a state machine, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the sensor processors 108, or in any practical combination thereof. In this regard, the sensor processors 108 each include or access a data storage element (or memory), which may be realized using any sort of non-transitory short or long term storage media, and which is capable of storing code or other programming instructions for execution by the sensor processor 108. In exemplary embodiments described herein, the code or other computer-executable programming instructions, when read and executed by the sensor processor 108, cause the sensor processor 108 to implement or otherwise perform the tasks, operations, functions, and processes needed to determine the locations and physical dimensions of the sensed objects 204, and to generate the object data representative of the determined locations and physical dimensions.

Figure 3:
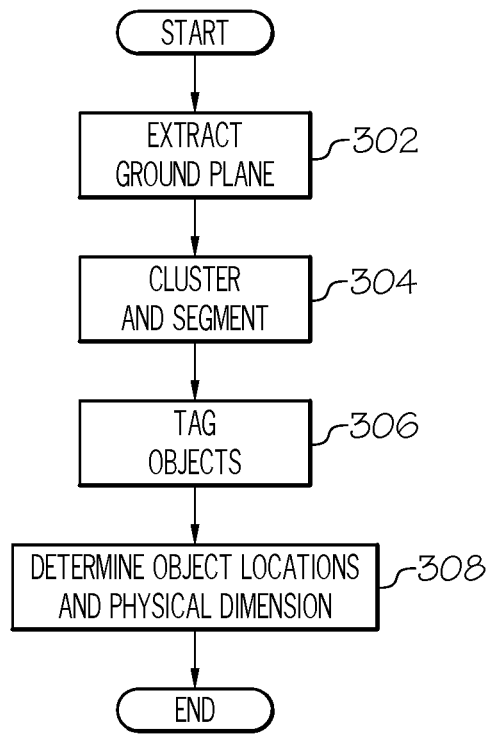
FIG. 3 depicts one embodiment, in flowchart form, of a 3D point cloud processing technique that may be implemented by the system of FIG. 1.

As noted above, in some embodiments each 3D LIDAR sensor 106 is implemented using a 3D flash LIDAR sensor that supplies 3D point cloud data 202. In such embodiments, each sensor processor 108, as may be appreciated, is configured to implement 3D point cloud data processing. The 3D point cloud processing implemented by each sensor processor 108 processes the 3D point cloud data 202 at every frame in real-time. The specific 3D point cloud processing technique that is implemented may vary. One particular 3D point cloud processing technique is depicted in FIG. 3, and with reference thereto will now be described. In doing so, it is noted that the parenthetical references refer to like numbered flowchart blocks in FIG. 3.

The depicted 3D point cloud processing technique begins by extracting the ground plane from the 3D point cloud data 202 (302). As is generally known, the ground plane is the surface (e.g., runway or taxiway) on which the aircraft is traveling. The ground plane is extracted by fitting a sub-set of the 3D points in the point cloud to the equation of a flat plane with constraints on the parameters of the equation of the plane obtained from the expected orientation and distance of the ground with respect to the sensor.

After the ground plane is extracted, the 3D point cloud data 202 are clustered and segmented to identify objects (304). This can be done by using standard clustering algorithms. One example method is based on fixing a distance threshold value and grouping together all 3D points that have a distance to closest neighboring point less than the selected threshold value. Further, if a ground plane has been found within the 3D point cloud, all points of the cluster belonging to the ground are segmented out. The remaining points in the cluster are grouped as an object.

Each of the identified objects is tagged (306) with a unique identification number. Thereafter, each sensor processor 108 computes the locations and physical dimensions of each of the objects (308), to thereby generate the object data that is supplied to its associated transmitter 112. One method of doing this is by using a convex hull. The processor computes a set of vertices such that all the 3D points belonging to the object are in the interior of the solid defined by the selected vertex points. The centroid of the vertex points can be selected as the location of the object and the relative positions of each of the other vertices with respect to the centroid are entered into the object data.

Returning once again to FIG. 1, each transmitter 112 is in operable communication with, and thus receives the object data from, a different one of the sensor processors 108. Each transmitter 112 is configured to transmit the received object data to the display device 104, an embodiment of which will be described momentarily. The transmitters may be variously configured and implemented to transmit the object data via any one or numerous wired or wireless communications protocols. In one particular embodiment, the transmitters 112 are each configured to wirelessly transmit the received object data. The wireless transmission protocol may also vary. For example, the wireless protocol may be an infrastructure-based wireless protocol, such as, for example, GSM or AeroMACS, or an ad hoc peer-to-peer protocol, such as, for example, Bluetooth® or WiFi Direct. These are only examples of any one of numerous wireless communications protocols that may be used to transmit the received object data to the display device 104.

Before proceeding with a description of the display device 104, it was previously noted that at least each of the depicted 3D LIDAR sensors 106 is preferably enclosed in an aircraft exterior lighting fixture 114. In the depicted embodiment, however, it is seen that additionally each sensor processor 108 and each transmitter 112 are also preferably enclosed, with their associated 3D LIDAR sensors 106, in an aircraft exterior lighting fixture 114.

Turning now to the display device 104, this portion of the system 100 is disposed remote from each of the obstacle sensors 102, such as, for example, in the cockpit 103 of the aircraft 101, and is configured to receive and fuse the object data transmitted from each transmitter 112. The display device 104 is further configured to fuse the received object data and to selectively generate one or more potential obstacle alerts based on the fused object data. The display device 104 may be variously configured to implement these functions. In the depicted embodiment, however, the display device 104 includes a display 116, a receiver 118, and a display processor 122.

The display 116 may be implemented using any one of coupled numerous known display technologies suitable for rendering textual, graphic, and/or iconic information in a format viewable by a user, which may rendered as two- or three-dimensional images, or as synthetic vision images. Some non-limiting examples of suitable displays 116 include any one of numerous types of cathode ray tube (CRT) displays, and any one of numerous types of flat panel displays such as LCD (liquid crystal displays) and TFT (thin film transistor) displays, just to name a few. The display 116 may be configured to implement the functionality of any one of numerous known aircraft displays. For example, the display 116 may be configured to implement a multi-function display (MFD), a primary flight display (PFD), or, in an embodiment described further below, as an airport moving map (AMM) display.

Regardless of its particular type and function, the display 116 is coupled to receive image rendering display commands and is configured, upon receipt of the commands, to render one or more images. As noted above, the images may be either two- or three-dimensional, and may include the overlay of text, alphanumeric information, or various other visual symbology. The display 116 may additionally be responsive to user input via a non-depicted user input device, which may be separate from the display device 104 and/or be integrated in the display 116 (e.g., a touch screen display).

The receiver 118 is configured to receive the object data transmitted from each of the transmitters 112. As with each of the transmitters 112, the receiver 118 may be variously configured and implemented to receive, via any one or numerous wired or wireless communications protocols, the transmitted object data. In one particular embodiment, the receiver 118 is configured to wirelessly receive the object data transmitted from each transmitter 112. As may be appreciated, the wireless protocol may vary, but will be compatible with the protocol used by the transmitters 112. For example, the wireless protocol may be an infrastructure-based wireless protocol, such as, for example, GSM or AeroMACS, or an ad hoc peer-to-peer protocol, such as, for example, Bluetooth® or WiFi Direct.

Figure 4:
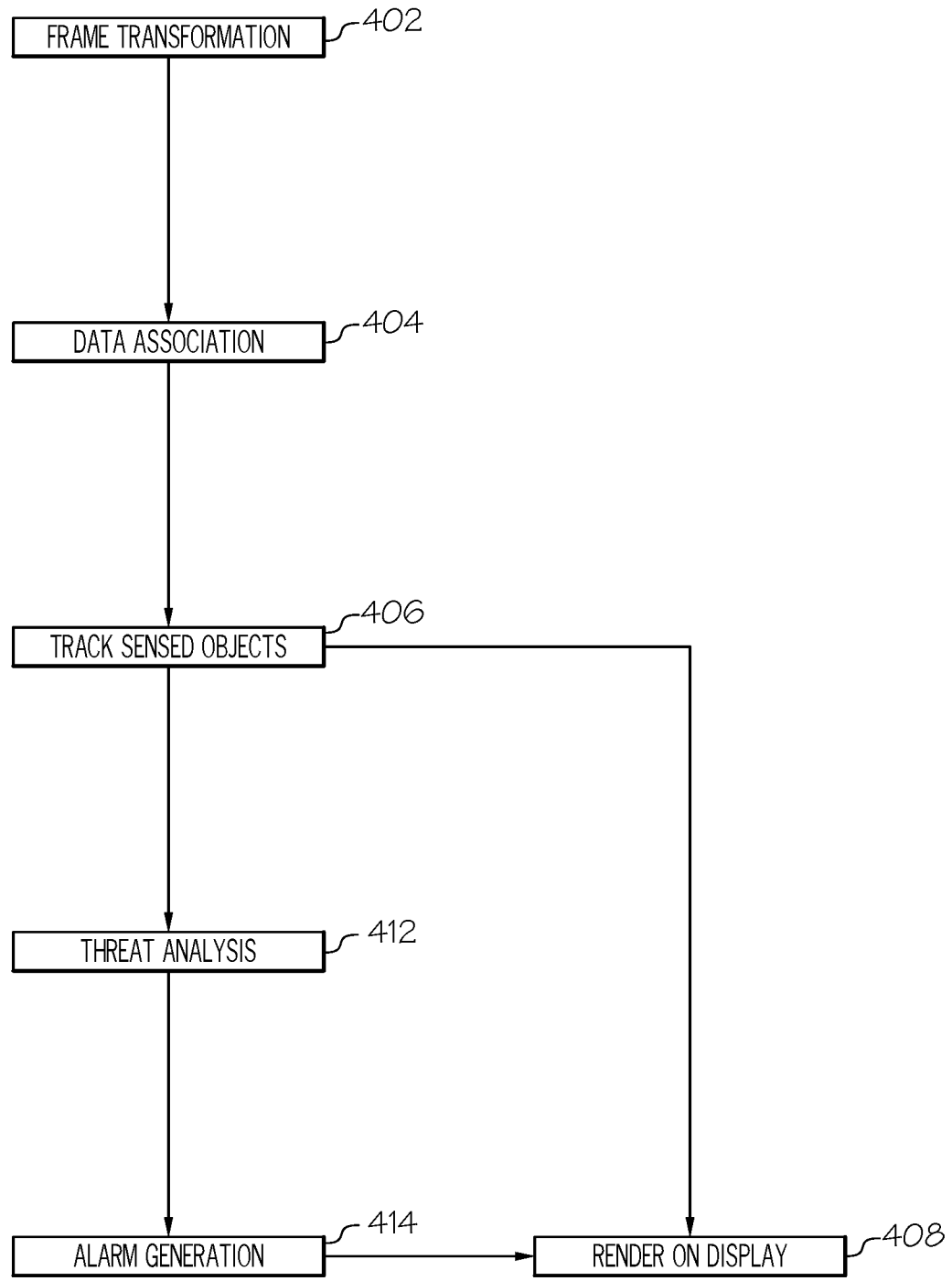
FIG. 4 depicts one embodiment, in flowchart form, of a processing technique to fuse object data and supply image rendering display commands.

The display processor 122 is coupled to, and thus receives the object data from, the receiver 118. The display processor 122 is configured to fuse the object data and supply the image rendering display commands to the display 116. It will be appreciated that, depending on the embodiment, the display processor 122 may be implemented or realized with a general-purpose processor, a microprocessor, a controller, a microcontroller, a state machine, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the display processor 122, or in any practical combination thereof. In this regard, the display processor 122 includes or accesses a data storage element (or memory), which may be realized using any sort of non-transitory short or long term storage media, and which is capable of storing code or other programming instructions for execution by the display processor 122. In exemplary embodiments described herein, the code or other computer-executable programming instructions, when read and executed by the display processor 122, cause the display processor 122 to implement or otherwise perform the tasks, operations, functions, and processes needed to fuse the object data and supply the image rendering display commands to the display 116. The specific processing technique that is implemented by the display processor 122 to fuse the object data and supply the image rendering display commands may vary. One particular processing technique is depicted in FIG. 4, and with reference thereto will now be described.

Figure 5:
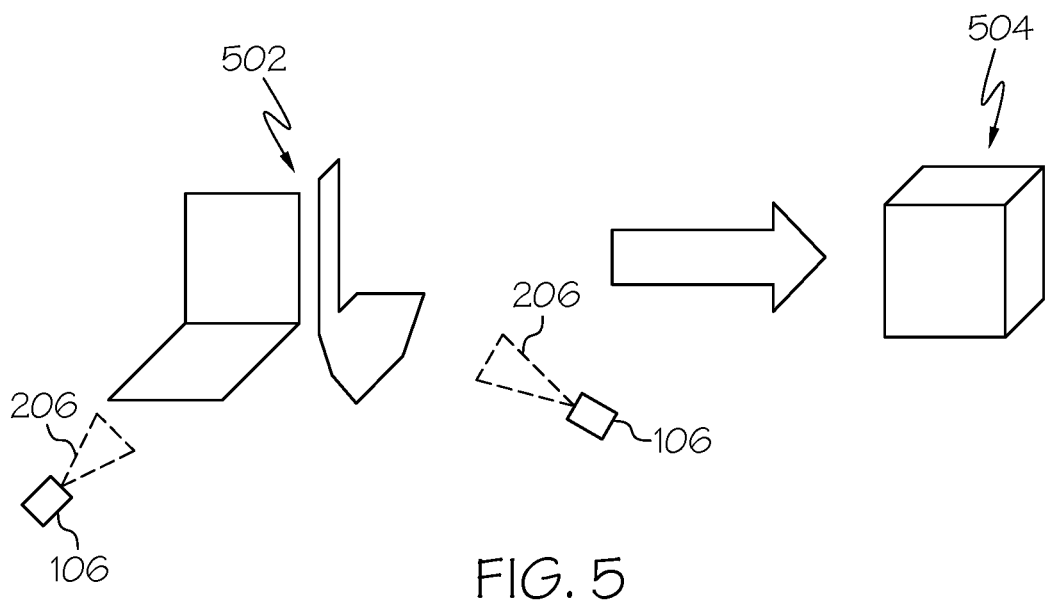
FIG. 5 depicts a simplified representation of the processing that is used when an object is within the field of view of two or more 3D LIDAR sensors.

The depicted processing technique begins by transforming the object data transmitted from each transmitter into a common reference frame (402). More specifically, into the reference frame of the aircraft 101. Thereafter, the object data are fused by combining the objects detected by more than one 3D LIDAR sensor 106 that correspond to the same object into a single object (404). For example, and with reference to FIG. 5, when an object is within the field-of-view 206 of two or more 3D LIDAR sensors 106, the 3D point cloud 502 corresponding to the object are merged, via data fusion, into a single object 504.

Returning to FIG. 4, each of the sensed objects is tracked (406). That is, the individual 3D point clouds 502 identified as objects 504 are tracked over time to generate relative velocity estimates (e.g., course and speed estimates), and each of the objects 504 are rendered on the display 116 (408). The relative velocity estimates, together with the physical dimensions of the objects, are also used to analyze whether a detected object poses a threat (412) and, if so, generate an appropriate alert(s) (414).

Figure 6:
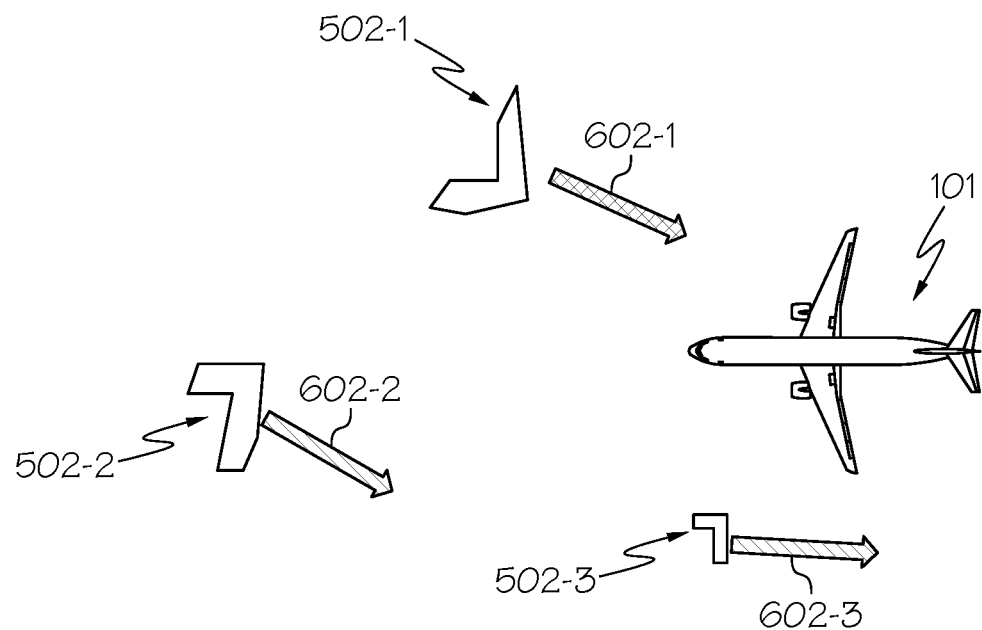
FIGS. 6 and 7 depict an example technique, in simplified form, that may be used to determine whether one or more sensed objects are a threat.
Figure 7:
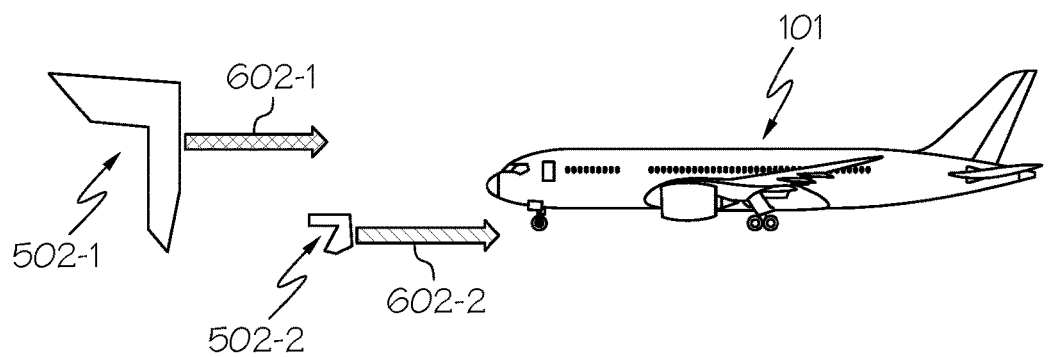

One example technique in which the sensed objects 504, and their associated relative velocities 602, are used to determine whether a detected object 504 is a threat is depicted in simplified form in FIGS. 6 and 7. In FIG. 6, three objects 504 have been detected—a first object 504-1, a second object 504-2, and a third object 504-3. However, only the first object 504-1 is a threat, because its relative velocity estimate 602-1 indicates that it is the only one on a collision course with the aircraft 101. In FIG. 7, two objects 504 have been detected—a first object 504-1 and a second object 504-2. Here too, only the first object 504-1 is a threat. But, not just because its relative velocity estimate 602-1 indicates that it is on a collision course with the aircraft 101, but because at least some part of the object is expected to collide with the aircraft. The second object 504-2, while having a similar relative velocity estimate 602 as the first object 504-1, is located at a lower relative height and has a physical size such that it does not pose a threat.

As may be appreciated, in both FIGS. 6 and 7, an appropriate alert is generated based on the first object 504-1 being determined to be a threat. The particular manner in which the alert is generated may vary. For example, the object 504, the relative velocity estimate 602, or both, may be rendered in a manner that differs from the objects(s) 504 not determined to be a threat. For example, using the examples depicted in FIG. 6, the first object 504-1, its associated relative velocity estimate 602-1, or both, may be rendered in a different color, or other distinguishing feature (such as flashing), from the other objects 504 and associated relative velocity estimates. Audible alarms may also (or instead) be generated, if needed or desired.

Figure 8:
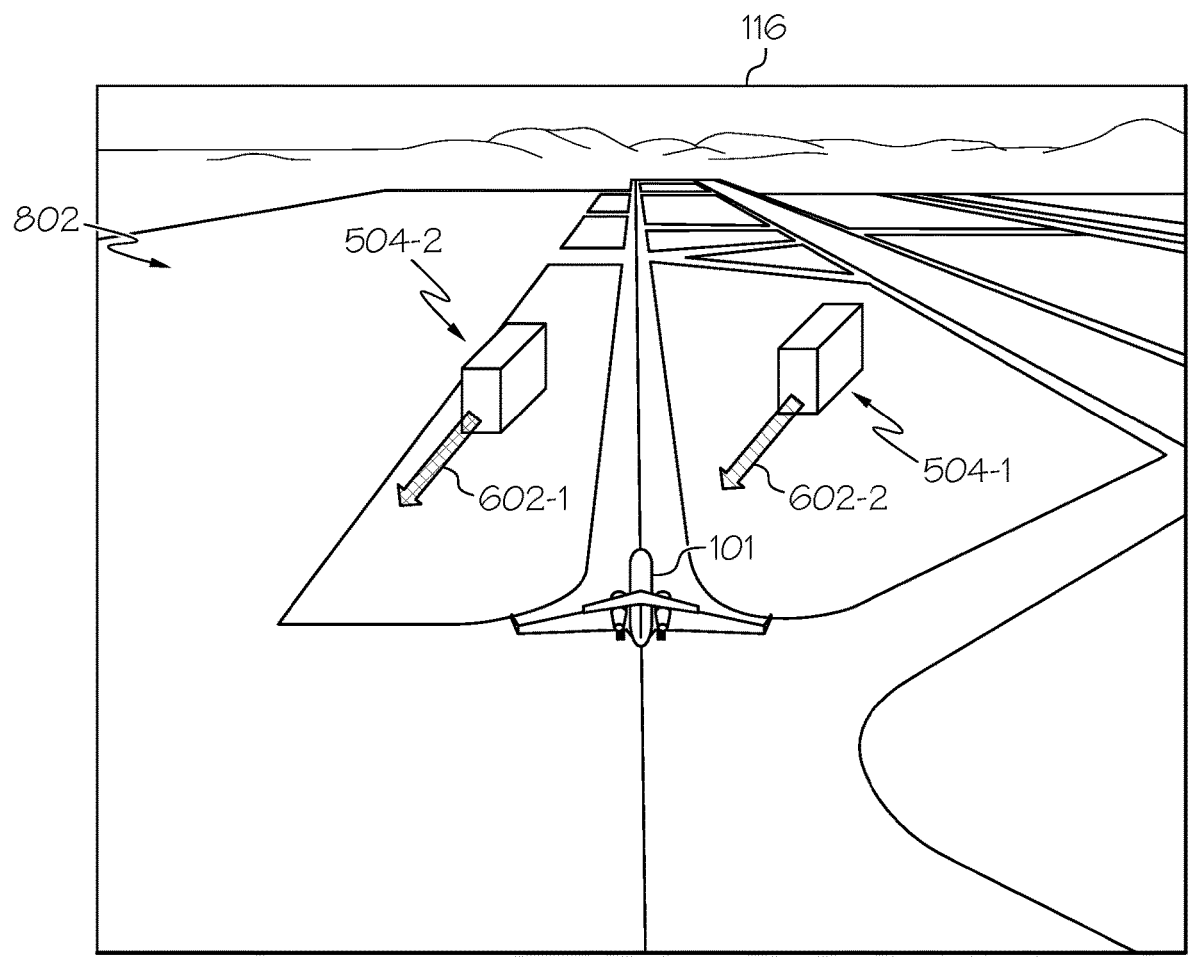
FIG. 8 depicts a simplified image that may be rendered on an Airport Moving Map display.

It was previously noted that the display 116 may, in some embodiments, be implemented as an overlay on top of an AMM display. One embodiment of such a display 116 is depicted in FIG. 8 and, for completeness, will now be described. The depicted display 116 is being commanded to render an AMM 802 together with an image of the aircraft 101 and two objects 504 (504-1, 504-2) that have been detected by the system 100 and their associated relative velocity estimates 602 (602-1, 602-2). In this particular instance, the first object 504-1 is determined to be a threat, whereas the second object 504-2 is not. As such, the first object 504-1 and its associated relative velocity estimate 602-1 are rendered in a manner that differs (e.g., different color) from that of the second object 504-2 and its associated relative velocity estimate 602-2.

Figure 9:
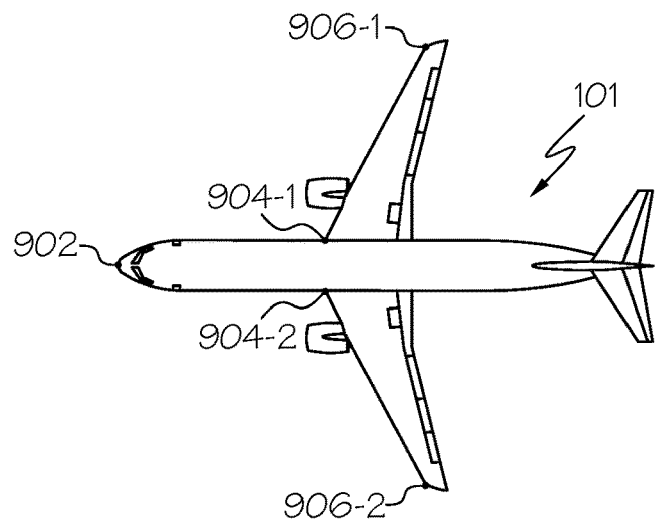
FIG. 9 depicts a top-down view of an aircraft and one example of the locations of aircraft exterior lighting fixtures in which 3D LIDAR sensors may be mounted.
Figure 10:
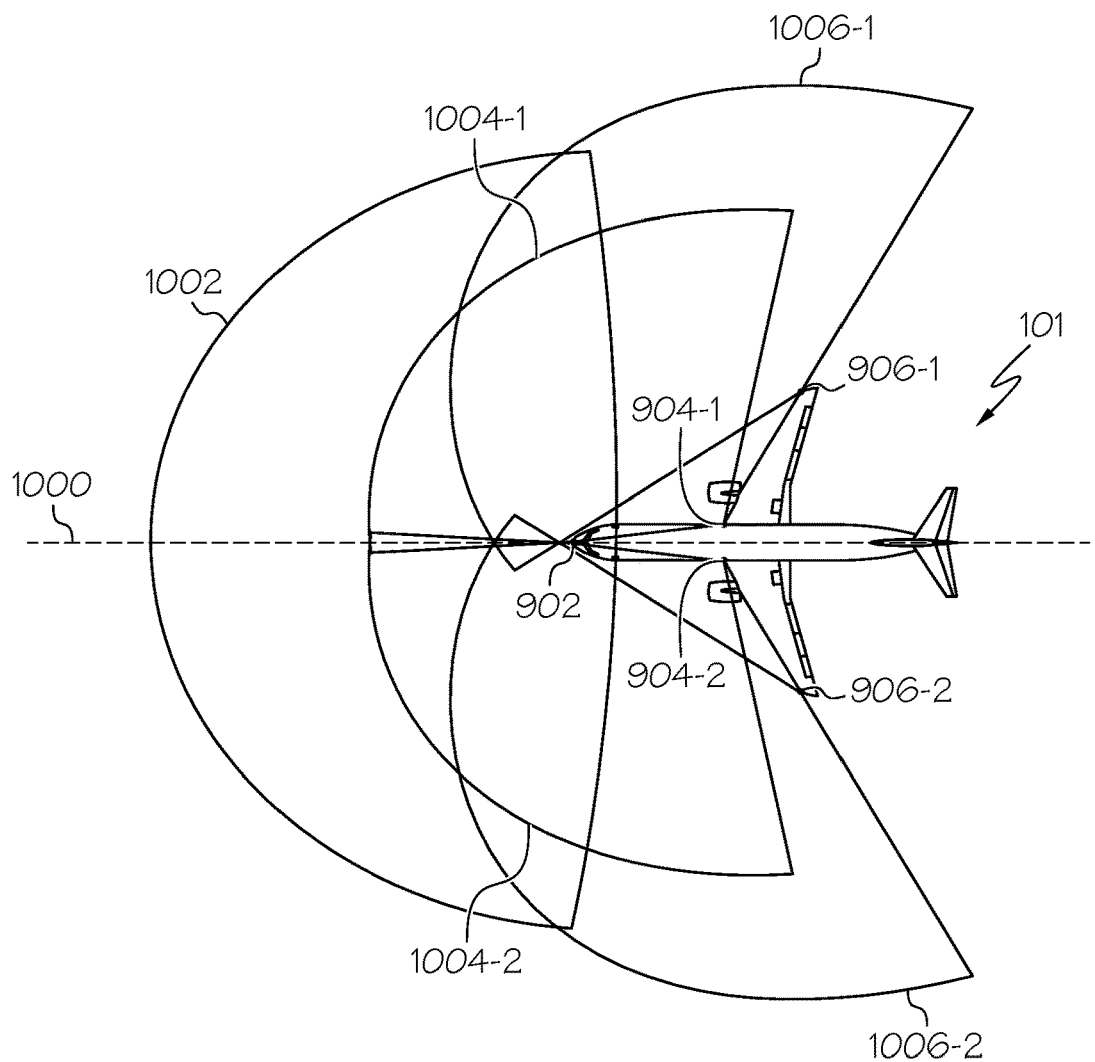
FIG. 10 depicts the field-of-view of each of the 3D LIDAR sensors when mounted in the aircraft exterior lighting fixtures of FIG. 9.

As noted earlier, the 3D LIDAR 106 sensors are preferably disposed within aircraft exterior lighting fixtures 114, which are then mounted at various locations on the aircraft 101. Although the specific number and specific aircraft exterior lighting fixtures 114 may vary, in one embodiment, which is depicted in FIG. 9, the aircraft exterior lighting fixtures include at least a nose gear landing light 902, first and second wing root lights 904-1, 904-2, and first and second wing tip lights 906-1, 906-2. When a 3D LIDAR sensor 106 is mounted in each of these aircraft exterior lights, the field-of-view of each of the associated 3D LIDAR sensor 106 is illustrated in FIG. 10. As FIG. 10 depicts, the 3D LIDAR sensor 106 disposed within the nose gear landing light 902 has a field-of-view 1002, relative to the axial centerline 1000 of the aircraft 101, spanning about 140-degrees (from about −70° to about +70°), the 3D LIDAR sensors 106 disposed within the first and second wing root lights 904-1, 904-2 each have a field-of-view 1004-1, 1004-2 spanning about 94.5-degrees (from about −4.5° to about +90° and from about +4.5° to about −90°, and the 3D LIDAR sensors 106 disposed within the first and second wing tip lights 906-1, 906-2 each have a field-of-view 1006-1, 1006-2 spanning about 140-degrees (from about −30° to about +110° and from about +30° to about −110°. Thus, the overall field-of-view of the entire system 100 spans about 220-degrees. It should be noted that these angles might vary depending upon the specific implementation and field-of-view opening available via the outer lens of aircraft exterior lights.

In one embodiment, an aircraft collision avoidance system includes a plurality of three-dimensional (3D) light detection and ranging (LIDAR) sensors, a plurality of sensor processors, a plurality of transmitters, and a display device. Each 3D LIDAR sensor has a field-of-view and is enclosed in an aircraft exterior lighting fixture that is configured for mounting on an aircraft. Each 3D LIDAR sensor is configured to sense objects within its field-of-view and supply sensor data. Each sensor processor is in operable communication with a different one of the 3D LIDAR sensors to receive the sensor data therefrom. Each sensor processor is configured to process the received sensor data to determine locations and physical dimensions of the sensed objects and generate object data representative of the locations and physical dimensions. Each transmitter is in operable communication with a different one of the sensor processors to receive the object data therefrom, and is configured to transmit the received object data. The display device is configured to receive and fuse the object data transmitted from each transmitter. The display device is further configured to fuse the object data and selectively generate one or more potential obstacle alerts based on the fused object data.

These aspects and other embodiments may include one or more of the following features. Each 3D LIDAR sensor comprises a 3D flash LIDAR sensor. The sensor data supplied by each 3D LIDAR sensor comprises 3D point cloud data that represents one or more objects within the field of view. Each sensor processor is configured to implement 3D point cloud data processing. The 3D point cloud data processing includes extracting a ground plane from the 3D point cloud data, the ground plane being a surface on which the aircraft is traveling; clustering and segmenting the 3D point cloud data to identify objects; tagging each of the identified objects; and determining locations and physical dimensions of each of the objects, to thereby generate the object data. The display device includes a display, a receiver, and a display processor. The display is coupled to receive image rendering display commands and is configured, upon receipt thereof, to render one or more images. The receiver is configured to wirelessly receive the object data transmitted from each transmitter. The display processor is coupled to the receiver to receive the object data therefrom, and is configured to fuse the object data and supply the image rendering display commands to the display. Each transmitter is configured to wirelessly transmit the received object data. The receiver is configured to wirelessly receive the object data transmitted from each transmitter. The display processor is configured to: transform the object data transmitted from each transmitter into a common reference frame; fuse the object data by combining objects detected by more than one 3D LIDAR sensor that correspond to a same object into a single object; track the objects over time; and determine when each object poses a potential obstacle.

In another embodiment, an aircraft collision avoidance system includes a plurality of three-dimensional (3D) flash light detection and ranging (LIDAR) sensors, a plurality of sensor processors, a plurality of transmitters, and a display device. Each 3D LIDAR sensor has a field-of-view and is enclosed in an aircraft exterior lighting fixture that is configured for mounting on an aircraft. Each 3D LIDAR sensor is configured to sense objects within its field-of-view and supply sensor data. Each sensor processor is in operable communication with a different one of the 3D LIDAR sensors to receive the sensor data therefrom. Each sensor processor is configured to process the received sensor data to determine locations and physical dimensions of the detected objects and generate object data representative of the locations and physical dimensions. Each transmitter is in operable communication with a different one of the sensor processors to receive the object data therefrom, and is configured to wirelessly transmit the received object data. The display device is configured to receive and fuse the object data transmitted from each transmitter, The display device is further configured to fuse the object data and selectively generate one or more potential obstacle alerts based on the fused object data. The display device includes a display, a receiver, and a display processor. The display is coupled to receive image rendering display commands and is configured, upon receipt thereof, to render one or more images. The receiver is configured to wirelessly receive the object data transmitted from each transmitter. The display processor is coupled to the receiver to receive the object data therefrom, and is configured to fuse the object data and supply the image rendering display commands to the display.

These aspects and other embodiments may include one or more of the following features. The sensor data supplied by each 3D LIDAR sensor comprises 3D point cloud data that represents one or more objects within the field of view, and each sensor processor is configured to implement 3D point cloud data processing. The 3D point cloud data processing comprises: extracting a ground plane from the 3D point cloud data, the ground plane being a surface on which the aircraft is traveling; clustering and segmenting the 3D point cloud data to identify objects; tagging each of the identified objects; and determining locations and physical dimensions of each of the objects, to thereby generate the object data. The display processor is configured to: transform the object data transmitted from each transmitter into a common reference frame; fuse the object data by combining objects detected by more than one 3D LIDAR sensor that correspond to a same object into a single obstacle; and track the sensed objects over time; and determine when each obstacle poses a obstacle threat. The objects and potential obstacle alerts generated by the display processor may be overlaid on a two-dimensional (2D) or three-dimensional (3D) Airport Moving Map (AMM) display.

In yet another embodiment, an aircraft includes a plurality of three-dimensional (3D) light detection and ranging (LIDAR) sensors, a plurality of sensor processors, a plurality of transmitters, and a display device. Each 3D LIDAR sensor has a field-of-view and is configured to sense objects within its field-of-view and supply sensor data. Each sensor processor is in operable communication with a different one of the 3D LIDAR sensors to receive the sensor data therefrom. Each sensor processor is configured to process the received sensor data to determine locations and physical dimensions of the sensed objects and generate object data representative of the locations and physical dimensions. Each transmitter is in operable communication with a different one of the sensor processors to receive the object data therefrom, and is configured to transmit the received object data. The display device is mounted within the aircraft and is configured to receive and fuse the object data transmitted from each transmitter. The display device is further configured to fuse the object data and selectively generate one or more potential obstacle alerts based on the fused object data.

These aspects and other embodiments may include one or more of the following features. Each 3D LIDAR sensor comprises a 3D flash LIDAR sensor. The sensor data supplied by each 3D LIDAR sensor comprises 3D point cloud data that represents one or more objects within the field of view. Each sensor processor is configured to implement 3D point cloud data processing. The 3D point cloud data processing includes extracting a ground plane from the 3D point cloud data, the ground plane being a surface on which the aircraft is traveling; clustering and segmenting the 3D point cloud data to identify objects; tagging each of the identified objects; and determining locations and physical dimensions of each of the objects, to thereby generate the object data. The display device includes a display, a receiver, and a display processor. The display is coupled to receive image rendering display commands and is configured, upon receipt thereof, to render one or more images. The receiver is configured to wirelessly receive the object data transmitted from each transmitter. The display processor is coupled to the receiver to receive the object data therefrom, and is configured to fuse the object data and supply the image rendering display commands to the display. Each transmitter is configured to wirelessly transmit the received object data. The receiver is configured to wirelessly receive the object data transmitted from each transmitter. The display processor is configured to: transform the object data transmitted from each transmitter into a common reference frame; fuse the object data by combining objects detected by more than one 3D LIDAR sensor that correspond to a same object into a single object; track the objects over time; and determine when each object poses a potential obstacle. A plurality of exterior lighting fixtures mounted on the exterior surface, the exterior lighting fixtures including at least a nose gear landing light, first and second wing root lights, and first and second wing tip lights, and each 3D LIDAR sensor is enclosed within a different one of the aircraft exterior lighting fixtures. The objects and potential obstacle alerts generated by the display processor may be overlaid on a two-dimensional (2D) or three-dimensional (3D) Airport Moving Map (AMM) display.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft collision avoidance system, comprising:
   a plurality of three-dimensional (3D) light detection and ranging (LIDAR) sensors, each 3D LIDAR sensor having a field-of-view and enclosed in an aircraft exterior lighting fixture that is configured for mounting on an aircraft, each 3D LIDAR sensor configured to sense objects within its field-of-view and supply sensor data;
   a plurality of sensor processors, each sensor processor in operable communication with a different one of the 3D LIDAR sensors to receive the sensor data therefrom, each sensor processor configured to process the received sensor data to determine locations and physical dimensions of the sensed objects and generate object data representative of the locations and physical dimensions;
   a plurality of transmitters, each transmitter in operable communication with a different one of the sensor processors to receive the object data therefrom, each transmitter configured to transmit the received object data; and
   a display device configured to receive and fuse the object data transmitted from each transmitter, the display device further configured to fuse the object data and selectively generate one or more potential obstacle alerts based on the fused object data.

2. The system of claim 1, wherein each 3D LIDAR sensor comprises a 3D flash LIDAR sensor.

3. The system of claim 1, wherein the sensor data supplied by each 3D LIDAR sensor comprises 3D point cloud data that represents one or more objects within the field of view.

4. The system of claim 3, wherein each sensor processor is configured to implement 3D point cloud data processing.

5. The system of claim 4, wherein the 3D point cloud data processing comprises:
   extracting a ground plane from the 3D point cloud data, the ground plane being a surface on which the aircraft is traveling;
   clustering and segmenting the 3D point cloud data to identify objects;
   tagging each of the identified objects; and
   determining locations and physical dimensions of each of the objects, to thereby generate the object data.

6. The system of claim 1, wherein the display device comprises:
   a display coupled to receive image rendering display commands and configured, upon receipt thereof, to render one or more images;
   a receiver configured to receive the object data transmitted from each transmitter; and
   a display processor coupled to the receiver to receive the object data therefrom, the display processor configured to fuse the object data and supply the image rendering display commands to the display.

7. The system of claim 6, wherein:
   each transmitter is configured to wirelessly transmit the received object data; and
   the receiver is configured to wirelessly receive the object data transmitted from each transmitter.

8. The system of claim 7, wherein the display processor is configured to:
   transform the object data transmitted from each transmitter into a common reference frame;
   fuse the object data by combining objects detected by more than one 3D LIDAR sensor that correspond to a same object into a single object;
   track the objects over time; and
   determine when each object poses a potential obstacle.

9. The system of claim 1, wherein:
   the sensor data supplied by each 3D LIDAR sensor comprises 3D point cloud data that represents one or more objects within the field of view; and
   each sensor processor is configured to implement 3D point cloud data processing.

10. The system of claim 9, wherein the 3D point cloud data processing comprises:
    extracting a ground plane from the 3D point cloud data, the ground plane being a surface on which the aircraft is traveling;
    clustering and segmenting the 3D point cloud data to identify objects;
    tagging each of the identified objects; and
    determining locations and physical dimensions of each of the objects, to thereby generate the object data.

11. An aircraft collision avoidance system, comprising:
a plurality of three-dimensional (3D) flash light detection and ranging (LIDAR) sensors, each 3D LIDAR sensor having a field-of-view and enclosed in an aircraft exterior lighting fixture that is configured for mounting on an aircraft, each 3D LIDAR sensor configured to sense objects within its field-of-view and supply sensor data;
a plurality of sensor processors, each sensor processor in operable communication with a different one of the 3D LIDAR sensors to receive the sensor data therefrom, each sensor processor configured to process the received sensor data to determine locations and physical dimensions of the detected objects and generate object data representative of the locations and physical dimensions;
a plurality of transmitters, each transmitter in operable communication with a different one of the sensor processors to receive the object data therefrom, each transmitter configured to wirelessly transmit the received object data; and
a display device configured to receive and fuse the object data transmitted from each transmitter, the display device further configured to fuse the object data and selectively generate one or more potential obstacle alerts based on the fused object data, the display device comprising:
a display coupled to receive image rendering display commands and configured, upon receipt thereof, to render one or more images;
a receiver configured to wirelessly receive the object data transmitted from each transmitter; and
a display processor coupled to the receiver to receive the object data therefrom, the display processor configured to fuse the object data and supply the image rendering display commands to the display.

12. The system of claim 11, wherein the display processor is configured to:
transform the object data transmitted from each transmitter into a common reference frame;
fuse the object data by combining objects detected by more than one 3D LIDAR sensor that correspond to a same object into a single obstacle;
track the sensed objects over time; and
determine when each obstacle poses a obstacle threat.

13. The system of claim 11, wherein the objects and potential obstacle alerts generated by the display processor are overlaid on a two-dimensional (2D) or three-dimensional (3D) Airport Moving Map (AMM) display.

14. An aircraft, comprising:
a plurality of three-dimensional (3D) light detection and ranging (LIDAR) sensors mounted at different positions on an exterior surface of the aircraft, each 3D LIDAR sensor having a field-of-view and configured to sense objects within its field-of-view and supply sensor data;
a plurality of sensor processors, each sensor processor in operable communication with a different one of the 3D LIDAR sensors to receive the sensor data therefrom, each sensor processor configured to process the received sensor data to determine locations and physical dimensions of the sensed objects and generate object data representative of the locations and physical dimensions;
a plurality of transmitters, each transmitter in operable communication with a different one of the sensor processors to receive the object data therefrom, each transmitter configured to transmit the received object data; and
a display device mounted within the aircraft and configured to receive and fuse the object data transmitted from each transmitter, the display device further configured to fuse the object data and selectively generate one or more potential obstacle alerts based on the fused object data.

15. The aircraft of claim 14, wherein:
each 3D LIDAR sensor comprises a 3D flash LIDAR sensor;
the sensor data supplied by each 3D flash LIDAR sensor comprises 3D point cloud data that represents one or more objects within the field of view; and
each sensor processor is configured to implement 3D point cloud data processing.

16. The aircraft of claim 15, wherein the 3D point cloud data processing comprises:
extracting a ground plane from the 3D point cloud data, the ground plane being a surface on which the aircraft is traveling;
clustering and segmenting the 3D point cloud data to identify objects;
tagging each of the identified objects; and
determining locations and physical dimensions of each of the objects, to thereby generate the object data.

17. The aircraft of claim 14, wherein the display device comprises:
a display coupled to receive image rendering display commands and configured, upon receipt thereof, to render one or more images;
a receiver configured to receive the object data transmitted from each transmitter; and
a display processor coupled to the receiver to receive the object data therefrom, the display processor configured to fuse the object data and supply the image rendering display commands to the display.

18. The aircraft of claim 17, wherein:
each transmitter is configured to wirelessly transmit the received object data; and
the receiver is configured to wirelessly receive the object data transmitted from each transmitter; and
the display processor is configured to:
transform the object data transmitted from each transmitter into a common reference frame;
fuse the object data by combining objects detected by more than one 3D LIDAR sensor that correspond to a same object into a single obstacle; and
determine when each obstacle poses a obstacle threat.

19. The system of claim 17, wherein the objects and potential obstacle alerts generated by the display processor are overlaid on a two-dimensional (2D) or three-dimensional (3D) Airport Moving Map (AMM) display.

20. The aircraft of claim 14, further comprising:
a plurality of exterior lighting fixtures mounted on the exterior surface, the exterior lighting fixtures include at least a nose gear landing light, first and second wing root lights, and first and second wing tip lights,
wherein each 3D LIDAR sensor is enclosed within a different one of the aircraft exterior lighting fixtures.

* * * * *